United States Patent [19]

Hoya

[11] Patent Number: 4,604,037
[45] Date of Patent: Aug. 5, 1986

[54] SLURRY PUMPING APPARATUS FOR SOLID-LIQUID SEPARATION

[76] Inventor: Takesi Hoya, 997-8, Oaza Bushi, Iruma-shi, Saitama-ken, Japan

[21] Appl. No.: 682,333

[22] Filed: Dec. 17, 1984

[30] Foreign Application Priority Data

Sep. 21, 1984 [JP] Japan ................................ 59-196757

[51] Int. Cl.⁴ .............................................. F04B 43/06
[52] U.S. Cl. ..................................... 417/394; 417/390
[58] Field of Search ........................ 417/394, 395, 390

[56] References Cited

U.S. PATENT DOCUMENTS

| | | | |
|---|---|---|---|
| 1,773,593 | 8/1930 | McLaughlin et al. | 417/390 X |
| 3,790,310 | 2/1974 | Whelan | 417/395 |
| 4,133,616 | 1/1979 | Poirier | 417/394 |

FOREIGN PATENT DOCUMENTS 898750  6/1962  United Kingdom ................ 417/394

*Primary Examiner*—Leonard E. Smith
*Attorney, Agent, or Firm*—Browdy and Neimark

[57] ABSTRACT

The present invention relates to a slurry pumping apparatus for solid-liquid separation. More specifically, the invention provides, in a slurry pumping apparatus arranged such that a diaphragm pump connected to an oil tank is actuated to deliver a hydraulic oil when a predetermined amount of slurry is supplied from a slurry tank to a solid-fluid separator, such as a filter press, which obtains cake from slurry, a slurry pumping apparatus for solid-liquid separation in which the diaphragm pump has its hydraulic pressure chamber connected to a supply/discharge pump through a changeover operation of a change-over valve such that the slurry is pumped to the solid-liquid separator by the operation of the diaphragm pump.

7 Claims, 6 Drawing Figures

SLURRY PUMPING APPARATUS FOR SOLID-LIQUID SEPARATION

FIELD OF THE INVENTION

The invention relates to the fields of the structure and control of an apparatus for pumping slurry, such as sludge, to a solid-liquid separator, for example, a filter press.

DESCRIPTION OF THE PRIOR ART

As is well known, effluent such as domestic or industrial waste water is subjected to solid-liquid separation by means of a filter press, for example, and the separated water content is returned to a water system as clarified water, while the separated sludge content, such as cake, is abandoned as solid waste. Current industrial growth, however, has brought about a higher standard of living in industrial societies; hence, the amount of domestic and industrial waste water has increased remarkably, and solid-liquid separating apparatuses, for example, which subject slurry to solid-liquid separation are now large plants. In this situation, it is strongly desired that slurry solid-liquid separating apparatuses be precisely controlled and managed. Erroneous operation or control such apparatuses may result in secondary environmental pollution.

One example of a slurry solid-liquid separating apparatus is, as schematically shown in FIG. 5, arranged such that slurry 2 in a slurry tank 1 is supplied by a pump 4 through a piping 3 to a solid-liquid separator 6, such as a filter press, through, for example, a valve 5 so as to be separated into clarified water and sludge, such as cake, which is abandoned as solid waste.

As slurry solid-liquid separating plants become larger, the pump 4 employed as an apparatus for pumping the slurry to the solid-liquid separator 6 must increase its output. As the output of the pump 4 is increased, a larger volume of slurry must be treated. It is not possible to cope with these needs with, for example, a simple reciprocating plunger pump. In consequence, a recent tendency is to employ, for example, a diaphragm pump which has large output and enables treatment of a large volume of slurry.

How a large volume of slurry is treated by batch and flow processes will be briefly explained hereinunder with reference to FIG. 6. The above-described diaphragm pump 7 is interposed in the piping 3 connected between the slurry tank 1 and the solid-liquid separator 6, and a changeover valve 10 is interposed in a connecting piping 9 between the diaphragm pump 7 and a working fluid tank 8 for supplying a working fluid to the diaphragm pump 7, whereby the working fluid is supplied to the diaphragm pump 7 by a pump 11, such as a plunger pump or a vane pump, and moreover, the working fluid is fed back from the diaphragm pump 7 to the working fluid tank 8 by a changeover operation of the changeover valve 10.

As described above, since the amount of slurry to be treated is currently extremely large, both the volume and output of the diaphragm pump 7 have increased correspondingly. Accordingly, any abnormal output state may result in breakdown of the diaphragm pump 7; therefore, it is difficult to effect smooth operation of the plant.

Further, in a conventional slurry treating plant, a simple pressure switch or similar means is employed to control the pumping of the working fluid from the working fluid tank 8 to the diaphragm pump 7 effected by the pump 11. In consequence, if the pressure switch malfunctions or fails to sense the upper or lower limit of pressure, an abnormally large amount of the working fluid may be pumped to the diaphragm pump 7 from the pump 11. In particular, in the case of the pressure switch which is constituted by a so-called high-grade sensor, such as an electronically-controlled sensor, a problem arises, in that failure occurs easily, and as the sensor becomes more complicated, it is more difficult to effect control thereof.

Furthermore, since between the working fluid tank 8 and the diaphragm pump 7 are disposed the piping 9 and the changeover valve 10, and further, a flow control valve, a check valve, a relief valve and so forth (not shown), the energy generated from the suction and discharge of the working fluid is converted into thermal energy, which unfavorably raises the temperature in the working fluid tank 8, thus disadvantageously causing expansion, for example, of the working fluid. This fact inconveniently prevents the controller from correctly operating.

Although it is possible to manually effect the changeover of the working fluid pumped to the diaphragm pump 7, such manual operation is extremely primitive as well as non-efficient and easily causes the above-described undesirable situations.

Further, to operate a large-volume diaphragm pump, it is easy to carry out a cycle of operations to supply the hydraulic pressure chamber of the diaphragm pump with a working fluid, such as oil, and to discharge the working fluid therefrom. The suction/discharge cycle is, however, disadvantageously long in the case of a single pump, and it is feared that the suction/discharge cycle may not match the cooling cycle.

SUMMARY OF THE INVENTION

Accordingly, the present invention has as a technical subject to be solved the above-described problems of the prior art, such as difficulty in properly supplying the working fluid to a large-volume and large-output diaphragm pump in a slurry treating plant, and it is a primary object of the invention to provide an excellent slurry pumping apparatus for a solid-liquid separator which is useful for slurry treating technique utilizing fields in the pollution treating industry, by arranging the apparatus such that it is possible to operate the apparatus at its rated operating conditions while making the best use of its advantages of large volume and large output, to adjust its ratings as desired, to facilitate the management and control of the apparatus and to make the apparatus free from failures.

DETAILED DESCRIPTION OF THE PREFERRED EMBODIMENT

Embodiments of the invention of this application will be described hereinunder with reference to FIGS. 1 to 4 in the accompanying drawings.

Figure 1:
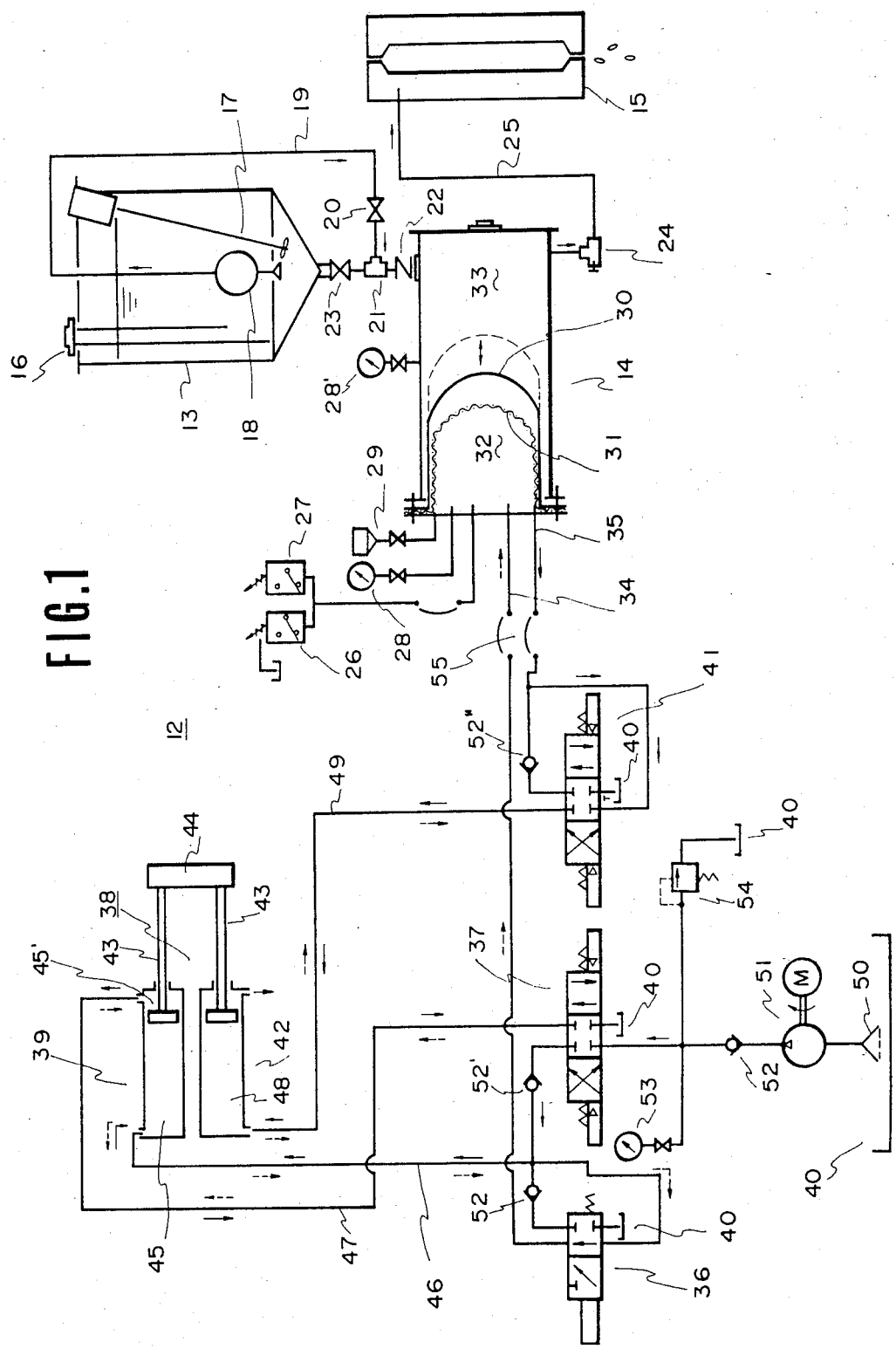
FIG. 1 is a diagram showing the connection between various mechanisms of one embodiment.
Figure 2:
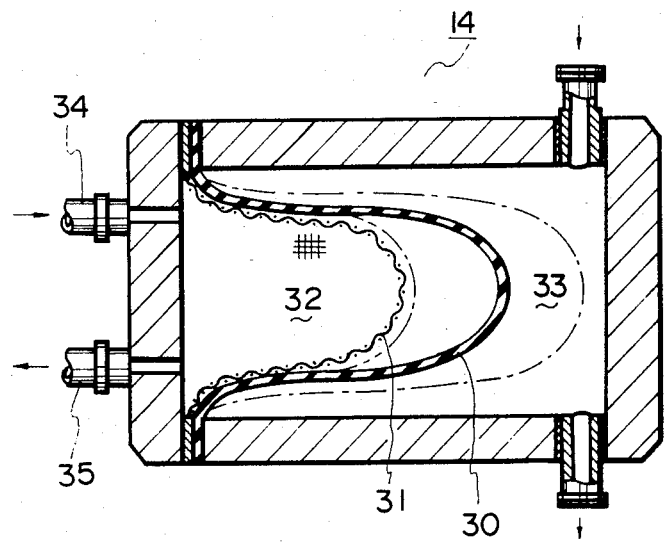
FIG. 2 is a sectional view of a diaphragm pump shown in FIG. 1.

In the embodiment shown in FIGS. 1 and 2, the reference numeral 12 denotes a slurry pumping apparatus for solid-liquid separation constituting the gist of the invention of this application. The slurry pumping apparatus 12 is arranged such that slurry, such as domestic waste water, is fed from a slurry tank 13 through a diaphragm pump 14 to a known filter press 15 such as a suction/discharge device, in which the slurry is sucked and discharged in a predetermined manner, and sludge, such as cake, is discharged in a predetermined manner, while the clarified water is fed back to a water system.

The slurry tank 13 is provided with a fluid level switch 16 in order to control the operations of a stirrer 17 and a supply pump 18 in relation to the upper and lower limits of the slurry in the tank 13. The supply pump 18 is adapted for head discharge so that the slurry deposited at the bottom inside the slurry tank 13 is not supplied to the diaphragm pump 14. The supply pump 18 is communicated with the diaphragm pump 14 through a head pumping pipe 19, a valve 21, a three-way valve 20 and a check valve 22. The supply pump 18 is further connected to the slurry tank 13 such as to effect a drain function through a valve 23.

The diaphragm pump 14 is connected to the filter press 15 by a feed pipe 25 through a drain plug 24.

The diaphragm pump 14 is provided with an upper-limit pressure switch 26 and a lower-limit pressure switch 27. Moreover, the diaphragm pump 14 is equipped with pressure gauges 28, 28' and is further provided with an oil inlet 29 for removal of air when the operation of the apparatus is initiated.

A diaphragm 30 is made of rubber and is able to expand and contract. The proximal portion of the diaphragm 30 is integrally connected to a flange of a casing of the diaphragm pump 14 such as to be sealed. The diaphragm 30 is provided therein with a case-type support net 31 of a predetermined mesh which is made of, for example, a stainless steel and has a satisfactorily high rigidity.

The size of the support net 31 is set such as to coincide with the size of the diaphragm 30 in its maximumly contracted state.

The inside of the diaphragm 30 is allowed to serve as a hydraulic pressure chamber 32 which is variable in volume. A slurry chamber 33 is defined between the outside of the diaphragm 30 and the casing of the diaphragm pump 14 such that the slurry from the slurry tank 13 is sucked and charged into the slurry chamber 33 and is pumped into the filter press 15 in a high-pressure state.

Further, the hydraulic pressure chamber 32 is connected with a suction pipe 34 and a discharge pipe 35 for an oil as a working fluid.

The suction pipe 34 of the diaphragm pump 14 is connected to a fluid supply pump 39 constituting one half of a supply/discharge pump 34 and to an oil tank 40 through changeover valves 36, 37. The discharge pipe 35 of the diaphragm pump 14 is connected to a fluid discharge pump 42 constituting the other half of the supply/discharge pump 38 and to the oil tank 40 through a changeover valve 41.

The fluid supply pump 39 and the fluid discharge pump 42 are mechanically connected through their respective rods 43 by means of a tie rod 44 such as to operate in synchronism with each other. A first pressurizing chamber 45 of the fluid supply pump 39 is connected to the changeover valve 36 through a pipe 46, while a second pressurizing chamber 45' is connected to the changeover valve 37 through a pipe 47.

A suction/discharge chamber 48 of the fluid discharge pump 42 is connected to the changeover valve 47 through a pipe 49.

Further, as illustrated, the oil tank 40 is connected to the changeover valve 37 through oil feed piping extending from a strainer 50 and having thereon a hydraulic pump 51, a check valve 52, a pressure gauge 53 and a relief valve 54.

Note that a flexible hose 55 is properly interposed in an intermediate portion of each of the suction pipe 34 and the discharge pipe 35.

EMBODIMENTS—OPERATION

In the above-described arrangement, in a first-stage process in which, with the slurry pumping apparatus 12 actuated, the solid-liquid separator 14 sucks thereinto the slurry from the slurry tank 13 and pumps the sucked slurry into the filter press 15 in the subsequent stage, first of all, in a changeover step the changeover valves 36, 37, 41 are in their neutral positions such as those shown in FIG. 1, and the hydraulic pump 51 overruns such as to allow the hydraulic oil to effect self-feedback to the oil tank 40 from the relief valve 54.

As a controller, not shown, is actuated to cause the changeover valve 36 to shift rightwardly as viewed in the Figure and the changeover valves 37, 41 to shift leftwardly from their neutral positions, the hydraulic oil from the oil tank 40 pumped by the hydraulic pump 51 is passed through the changeover valve 37, opens a check valve 52' and enters the first pressurizing chamber 45 of the fluid supply pump 39 through the pipe 46.

It is to be noted that the hydraulic oil shifting toward the changeover valve 36 opens a check valve 52 and is similarly pumped into the pressurizing chamber 45 through the pipe 46.

In consequence, the piston of the fluid supply pump 39 normally shifts the rod 43 rightwardly, thus actuating the fluid discharge pump 42 through the tie rod 44 to shift also rightwardly through its rod 43 in one unit with the fluid supply pump 39.

Accordingly, a vacuum is produced in the suction/discharge chamber 48 of the fluid discharge pump. In this process, however, the changeover valve 41 has normally shifted leftwardly as described above, and the suction/discharge chamber 48 and the fluid discharge pump 32 of the diaphragm pump 14 are connected together through the discharge pipe 35 and the changeover valve 41.

At this time, the valve 20 is also opened through a controller, not shown, and the supply pump 18 of the slurry tank 13 supplies the slurry to the slurry chamber 33 of the diaphragm pump 14 through the supply pipe 19 and the check valve 22.

Accordingly, pressure unbalance is made between the hydraulic pressure chamber 32 and the slurry chamber 33 inside the diaphragm pump 14. In consequence, the hydraulic oil inside the hydraulic pressure chamber 32 is fed into the suction/discharge chamber 48 of the fluid discharge pump 42 through the discharge pipe 35, the flexible hose 55, the changeover valve 41 and the pipe 49.

Although, in the meantime, the diaphragm 30 of the diaphragm pump 14 is gradually contracted, the contracted shape of the diaphragm 30 is prevented by the support net 31 from being irregularly deformed and is restricted by the support net 31 to its final contracted shape.

Thus, the hydraulic oil inside the hydraulic pressure chamber 32 of the diaphragm pump 14 is once returned to the suction/discharge chamber 48 of the fluid discharge pump 42.

It is to be noted that, in this case, the air in the chamber in the fluid discharge pump 42 on the righthand side of the piston thereof is discharged to the outside through a proper filter.

The hydraulic oil filled in the second pressuring chamber 45″ of the fluid supply pump 39 is fed back to the oil tank 40 through the pipe 47 and the changeover valve 37.

When the fluid supply pump 39 and the fluid discharge pump 42 have reached their stroke ends, the tie rod 44 actuates a limit switch, not shown, to de-energize the changeover valve 36 through the controller, not shown. As a result, the changeover valve 36 shifts leftwardly to return to the illustrated position. Moreover, the changeover valves 37, 41 are switched over such as to shift rightwardly from their illustrated positions.

Thereupon, the hydraulic pump 51 feeds the hydraulic oil from the oil tank 40 to the fluid supply pump 39 such that the piston of the fluid supply pump 39 is normally leftwardly shifted, whereby also the piston of the fluid discharge pump is normally leftwardly shifted in one unit with the piston of the fluid supply pump 39 through the rods 43, 43 and the tie rod 44.

Accordingly, the hydraulic oil returned from the hydraulic pressure chamber 32 of the diaphragm pump 14 and filled in the suction/discharge chamber 48 of the fluid discharge pump 42 as described above is fed back to the oil tank 40 through the pipe 49 and the changeover valve 41.

Thus, as will be understood from the above-described process, the hydraulic oil in the hydraulic pressure chamber 32 of the diaphragm pump 14 is fed back to the oil tank 40 in a two-stroke manner such that the hydraulic oil is temporarily returned to the suction/discharge chamber 48 of the fluid discharge pump 42 so as to be temporarily stored therein and is then returned to the oil tank 40.

The hydraulic oil, which is filled in the first pressuring chamber 45 of the fluid supply pump 39 after being employed to once return the hydraulic oil in the hydraulic pressure chamber 32 of the diaphragm pump 14 to the suction/discharge chamber 48 of the fluid discharge pump 42, is fed through the pipe 46 as shown by the dotted line and is fed into the hydraulic pressure chamber 32 of the diaphragm pump 14 from the suction pipe 34 through the changeover valve 36 and the flexible hose 55. In consequence, the diaphragm 30 is pressed by the thus fed hydraulic oil such as to expand in order to press the slurry from the slurry tank 13 having been sucked and charged into the slurry chamber 33, whereby the slurry is prevented from returning to the slurry tank through the check valve 22 and is fed into the filter press 15 through the drain plug 24 and the passage 25.

Thus, one cycle is completed when the respective pistons of the fluid supply pump 39 and the fluid discharge pump 42 have reached their stroke ends and the hydraulic oil in the suction/discharge chamber 48 of the fluid discharge pump 42 has been returned to the oil tank 40 while the hydraulic oil in the first pressurizing chamber 45 of the fluid supply pump 39 has been filled into the hydraulic pressure chamber 32 of the diaphragm pump 14. Then, the operation is recycled such that the tie rod 44 actuates the limit switch, not shown, again, to operate the controller, not shown, such as to return the hydraulic oil of the hydraulic pressure chamber 32 of the diaphragm pump 14 and to suck and charge the slurry from the slurry tank 13 into the slurry chamber 33.

The following is a confirmation of the above-described process: The hydraulic oil in the first pressurizing chamber 45 of the fluid supply pump 39 is supplied to the hydraulic pressure chamber 32 of the diaphragm pump 14, and then the hydraulic oil in the hydraulic pressure chamber 32 is returned to the suction/discharge chamber 48 of the fluid discharge pump 42. In consequence, the return of the hydraulic oil in the hydraulic pressure chamber 32 of the diaphragm pump 14 to the oil tank 40 and the suction and charging of the hydraulic oil in the pressurizing chamber 45 of the fluid supply pump 39 into the hydraulic pressure chamber 32 of the diaphragm pump 14 are one cycle delayed from each other in relation to the oil tank 40. Accordingly, the hydraulic oil in the hydraulic pressure chamber 32 of the diaphragm pump 14 is fed back to the oil tank 40 after being stored in the suction/discharge chamber 48 of the fluid discharge pump 42 for one cycle and therefore is delayed a half cycle as seen from the oil tank 40. The charging of hydraulic oil from the pressurizing chamber 45 of the fluid supply pump 39 into the diaphragm pump 14 is delayed a half cycle from the viewpoint of the oil tank 40. Hence, there is no possibility that the hydraulic oil fed back to the oil tank 40 may be immediately returned to the hydraulic pressure chamber 33 of the diaphragm pump 14.

The hydraulic oil, which is supplied to and discharged from the hydraulic pressure chamber 32 of the diaphragm pump 14 through the operations of the fluid supply pump 39 and the fluid discharge pump 42 can be satisfactorily cooled for operating the diaphragm pump 14 without any need for providing a cooling device or the like on the oil tank 40 and without increasing the tank volume in order to cool the hydraulic oil.

Further, as shown in FIG. 2, in its expanding course, the diaphragm 30 of the diaphragm pump 14 expands in a predetermined manner so as to compress the slurry. When contacting, the diaphragm 30 is supported by the support net 31 such that its maximumly contracted posture is satisfactorily maintained. Thus, the expansion and contraction of the diaphragm 30 can be smoothly effected.

Figure 4:
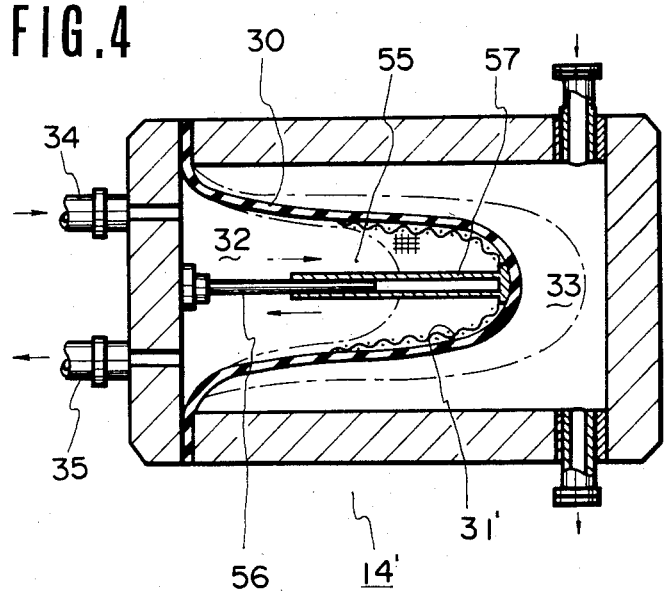
FIG. 4 is a sectional view of a diaphragm pump shown in FIG. 3.
Figure 3:
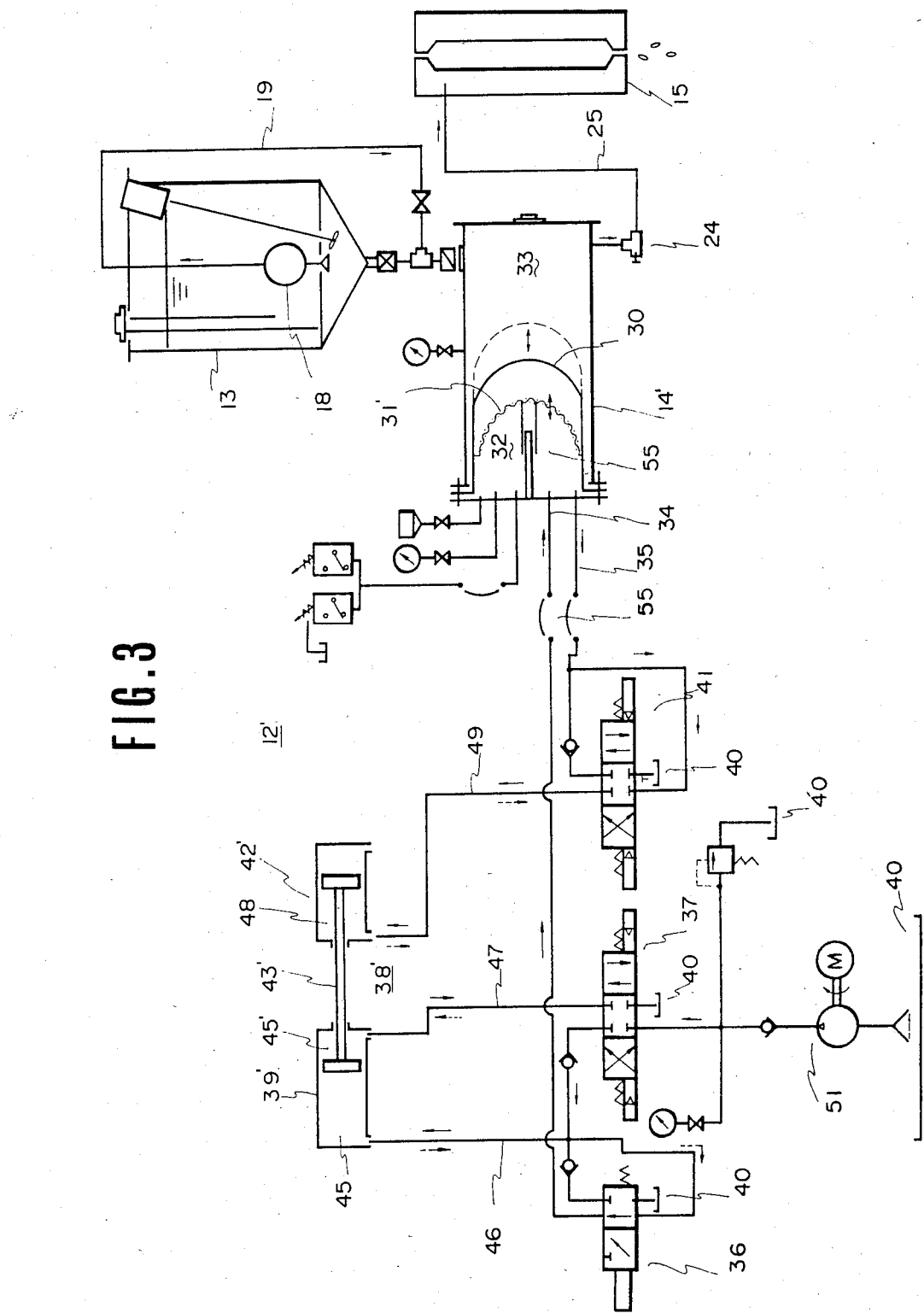
FIG. 3 is a diagram showing the connection between various mechanisms of another embodiment, equivalent to FIG. 1.
Figure 5:
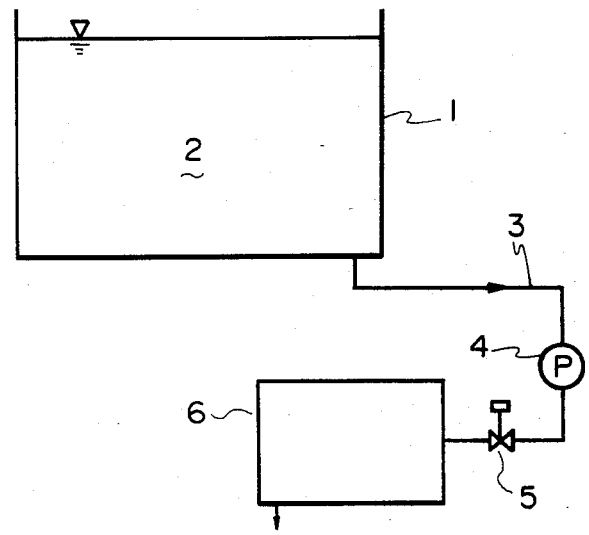
FIG. 5 is a schematic illustration showing various mechanisms of a conventional slurry pumping apparatus.
Figure 6:
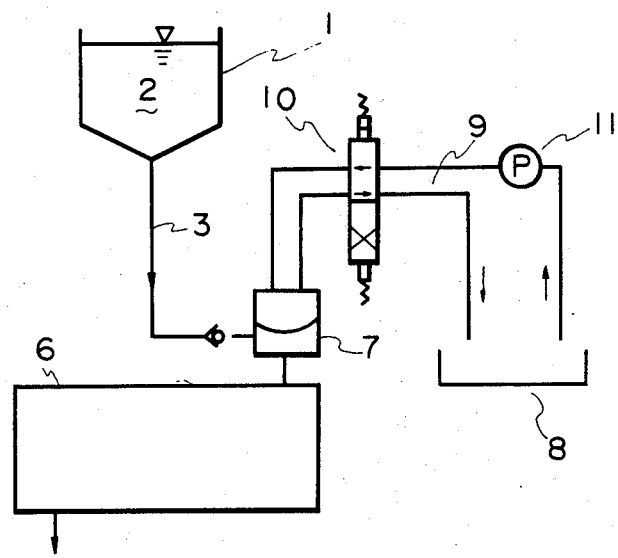
FIG. 6 is a detailed view of an essential part of the conventional slurry pumping apparatus.

FIGS. 3 and 4 in combination show another embodiment, in which a supply/discharge pump 38′ is constituted by two pumps mechanically connected in series through a single rod 43′, whereas the supply/discharge pump 38 in the above-described embodiment is constituted by the two pumps mechanically connected in parallel through the tie rod 44. Further, although the support net 31 of the diaphragm pump 14 in the first-described embodiment is secured at its proximal end to the casing of the diaphragm pump 14, a support mechanism 55 for supporting the diaphragm 30 in this embodiment is arranged such that, as shown in FIG. 4, a support net 31' for the diaphragm 30 of a diaphragm pump 14' is secured to the distal end of a sleeve 57 and is adapted to be able to advance and retract longitudinally while being guided by a guide rod 56 extending from a cover of the casing with the expansion and contraction of the diaphragm 30. The action and effect of this embodiment are practically the same as those of the first-described embodiment.

It is to be noted that the above-described embodiments of the invention of this application are, of course, not exclusive and various forms may be employed to carry out the invention. For example, a cooling device may be provided on the oil tank.

As has been described above, according to the invention of this application, the following various effects are offered: Basically, it is advantageously possible to feed a large amount of slurry by the use of a large output diaphragm pump as a pump which is connected to a solid-liquid separator so as to pump the slurry in a slurry tank. Further, since the supply of working fluid to a hydraulic pressure chamber defined by a diaphragm inside the diaphragm pump is effected by a fluid supply pump, it is possible to plan the operation in advance. Thus, there is no fear that an excessive amount of high-pressure working fluid may be supplied to destroy the diaphragm pump or to cause an unexpected failure.

The durability of the cooling apparatus or the plant is favorably improved, and a solid-liquid separating operation can be advantageously carried out efficiently without fail.

Moreover, since the hydraulic pressure chamber of the diaphragm pump is connected to the supply/discharge pump through the changeover valves, the working fluid can be supplied to and discharged from the hydraulic pressure chamber of the diaphragm pump through the passage exclusively employed for supply and discharge, respectively. Further, since the fluid supply pump and the fluid discharge pump are connected to the oil tank through the respective changeover valves, the hydraulic oil in the hydraulic pressure chamber of the diaphragm pump is temporarily returned to the fluid discharge pump and is then fed back to the oil tank. The hydraulic oil supplied to the fluid supply pump from the oil tank is supplied to the hydraulic pressure chamber of the diaphragm pump with a desired delay. For this reason, the working fluid is not directly supplied or discharged between the oil tank and the hydraulic pressure chamber of the diaphragm pump within one stroke. The working fluid having been fed back to the tank is not immediately returned to the hydraulic pressure chamber in a subsequent step. The working fluid having been supplied to the hydraulic pressure chamber is also fed back to the oil tank with a desired delay. Thus, it is advantageously possible to recirculate the working fluid supplied and discharged while satisfactorily cooling the same without any need for increasing the size of the oil tank in order to provide a cooling step. In addition, the above-described operation does not require any increase in the volume of the oil tank itself but makes it possible to minimize the size thereof.

Furthermore, the supply/discharge pump is constituted by a fluid supply pump and a fluid discharge pump which are connected in series or in parallel, and these pumps can be simultaneously operated in one unit. Thus, it is possible to increase the degree of freedom when designing the size of the tank.

What is claimed is:

1. In a slurry pumping apparatus including a hydraulic pressure source, and a diaphragm pump, interposed between a solid-liquid separator and a slurry tank, and connected to an oil tank, the diaphragm pump having a hydraulic pressure chamber connected to a supply/discharge pump through changeover valve means, the improvement comprising: said supply/discharge pump comprising a fluid supply pump and a fluid discharge pump which are mechanically connected together such as to be operable as one unit, said fluid discharge pump having its suction/discharge chamber connected through a suction/discharge passage to a first changeover valve communicating with said oil tank and the hydraulic pressure chamber of said diaphragm pump, said fluid supply pump having a first pressurizing chamber connected to said oil tank through a second changeover valve, and a second pressurizing chamber connected to said oil tank and to the hydraulic pressure chamber of said diaphragm pump.

2. The improvement according to claim 1, wherein said fluid discharge pump and said fluid supply pump are connected in series.

3. The improvement according to claim 1, wherein said fluid discharge pump and said fluid supply pump are connected in parallel.

4. In a slurry pumping apparatus including a hydraulic pressure source, and a diaphragm pump, interposed between a solid-liquid separator and a slurry tank, and connected to an oil tank, said diaphragm pump having a hydraulic pressure chamber connected to a supply/discharge pump through changeover valve means, a slurry pumping apparatus for solid-liquid separation comprising: said supply/discharge pump being composed of a fluid supply pump and a fluid discharge pump which are mechanically connected together such as to be operable as one unit, said fluid discharge pump having its suction/discharge chamber connected through a suction/discharge passage to a first changeover valve communicating with said oil tank and the hydraulic pressure chamber of said diaphragm pump, said fluid supply pump having a first pressurizing chamber connected to said oil tank through a second changeover valve, and a second pressurizing chamber connected to said oil tank and to the hydraulic pressure chamber of said diaphragm pump, and the hydraulic pressure chamber of said diaphragm pump being provided therein with a support net for a diaphragm.

5. A slurry pumping apparatus for solid-liquid separation according to claim 4, wherein said support net is adapted to advance and retract in the axial direction.

6. A slurry pumping apparatus for solid-liquid separation according to claim 5, wherein said support net is engaged at its proximal portion thereof with said diaphragm.

7. A slurry pumping apparatus for solid-liquid separation according to claim 5, wherein said support net is attached to a sleeve which slides on a guide secured to a casing.

* * * * *